United States Patent [19]

Wormmeester et al.

[11] 4,136,619
[45] Jan. 30, 1979

[54] CARRIAGE FOR CONTAINER TRANSPORT AND TRANSFER PLANT FOR CONTAINERS

[75] Inventors: Gerhardus J. Wormmeester, Zwijndrecht; Joannes C. Rijsenbrij, Boskoop, both of Netherlands

[73] Assignee: Europe Container Terminus B.V., Rotterdam, Netherlands

[21] Appl. No.: 804,798

[22] Filed: Jun. 8, 1977

[30] Foreign Application Priority Data

Jun. 9, 1976 [NL] Netherlands ..................... 7606231

[51] Int. Cl.² ........................................... B62D 13/04
[52] U.S. Cl. ............................... 104/244.1; 180/131; 280/444
[58] Field of Search ................. 104/242, 243, 244.1, 104/139, 244–247; 105/176; 180/79, 131; 280/442–444

[56] References Cited

U.S. PATENT DOCUMENTS

| 2,834,303 | 5/1958 | Furrer | 105/176 |
| 3,338,182 | 8/1967 | Maestrelli | 104/247 |
| 3,734,538 | 5/1973 | Homes | 280/442 X |
| 3,796,165 | 3/1974 | Goode | 104/247 |
| 3,872,794 | 3/1975 | Goode | 104/247 |

FOREIGN PATENT DOCUMENTS 1127951 9/1968 United Kingdom ................. 104/244.1

Primary Examiner—L. J. Paperner
Assistant Examiner—Randolph A. Reese
Attorney, Agent, or Firm—Finnegan, Henderson, Farabow & Garrett

[57] ABSTRACT

A transport carriage adaptable for use in a transfer system having both rail-guided and railless conveying regions. The steering mechanism of this carriage has a yoke connected to another vehicular carriage or tractor for imparting a steering movement to the carriage when the carriage is in the railless conveying region and at least one guide roller for imparting a steering movement to the carriage when the roller is in contact with the rails of the rail-guided conveying region. A guiding arm which transmits steering movement to the wheels of the carriage through transmissions is selectively coupled to the yoke for receiving steering movement therefrom when the carriage is in the railless conveying region. The guide roller is mounted to the guiding arm to impart steering movement to the guiding arm when the arm is decoupled from the yoke and the roller contacts the rails of the rail-guided conveying region. The transfer system has control apparatus for selectively coupling and decoupling the guide arm to the yoke at transition points between the two conveying regions.

6 Claims, 4 Drawing Figures

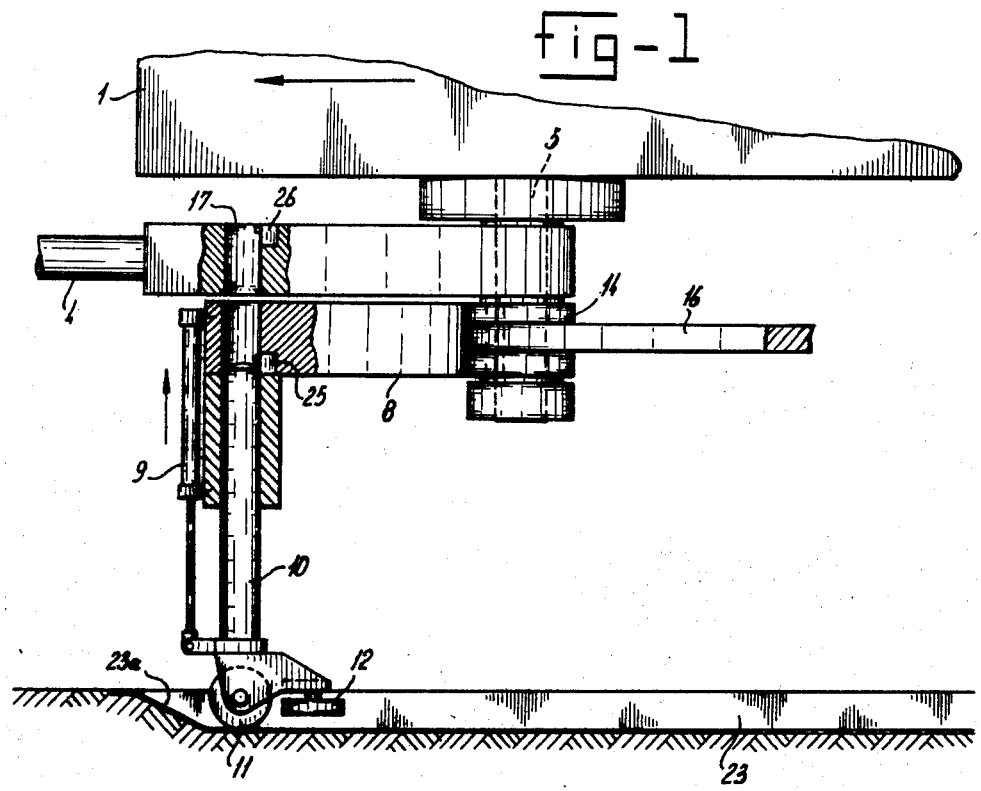
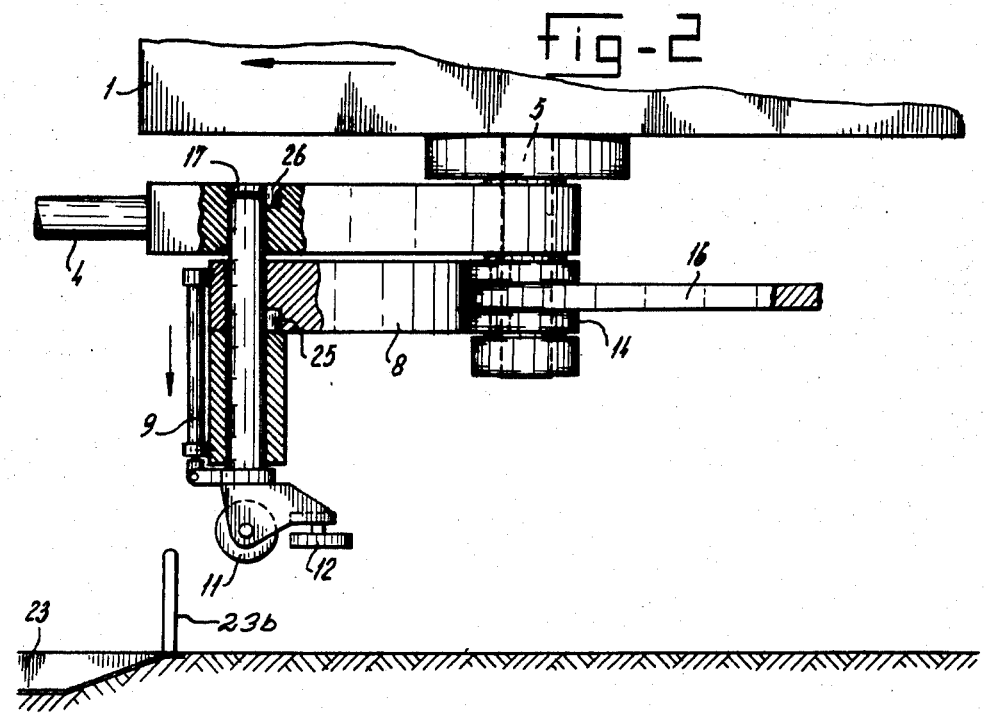

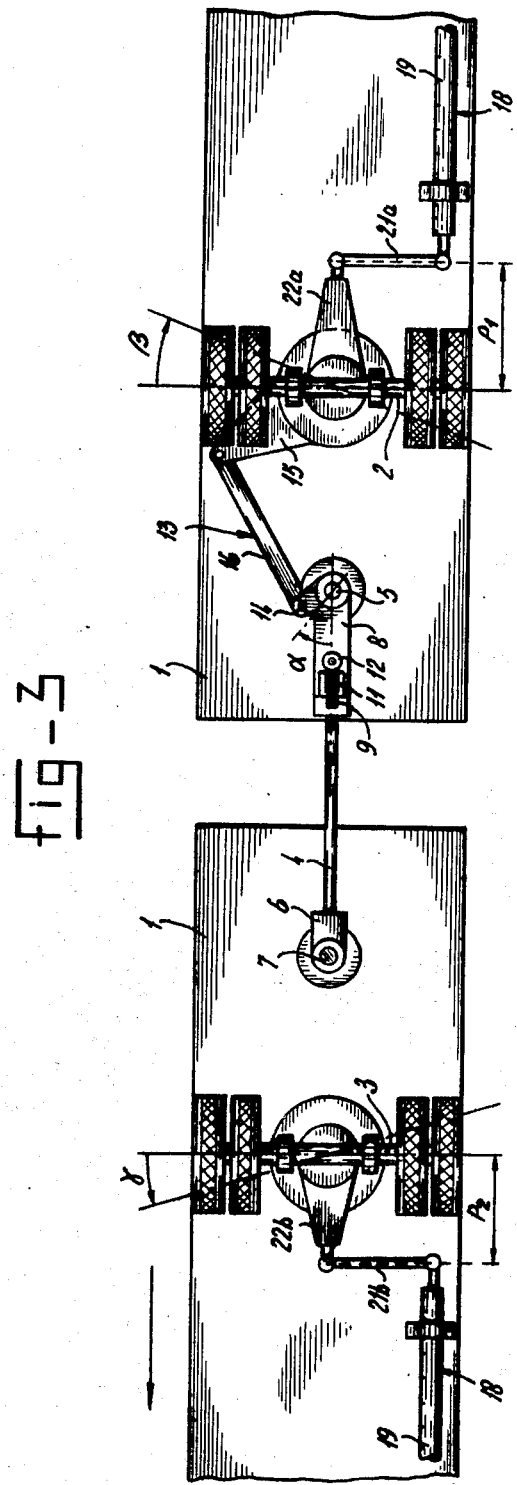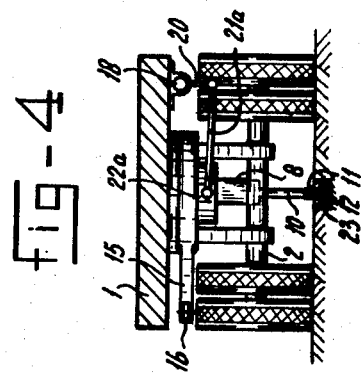

CARRIAGE FOR CONTAINER TRANSPORT AND TRANSFER PLANT FOR CONTAINERS

The present invention relates primarily to a carriage for freight transport and container transport in particular, said carriage being provided with a pole for coupling same with a tractor or corresponding carriage, a front-wheel pair and a rear-wheel pair, a first transmission between said front-wheel pair and a steering element hinged on said carriage.

Dutch Patent Application No. 75.02542 refers to an unloading bridge for containers, in which a track has been laid out on the floor for freight carriages and the bridge has been provided with means to move the carriages with a constant stroke. When nearing the unloading bridge, the carriages should take an accurately determined position. For practical reasons, the carriages on the quay will be guided by a rail. The container transfer plant where such an unloading bridge is being used comprises also storage yards, where the containers are temporarily stored. It would be unpractical to convey the carriages entirely along rail-guided tracks to and from the storage yards. If, during transportation by a train constituting a tractor and a number of carriages, part of the route being used is not rail-guided, it is desirable that the carriages follow as much as possible the track covered by the tractor. The cutting of corners leads to a loss of storage surface and to dangerous maneuvers.

Taking into consideration the above-mentioned problems, the invention relates to the construction of a carriage for container transport which meets the following requirements:

a number of carriages must be coupled with each other so as to form a train;

each carriage must be adapted for a non-guided and a rail-guided track;

in the bends of the non-guided course, the carriages should follow in the most accurate way the track covered by the tractor;

at the point of transition between the non-guided track and the rail-guided track, automatic adaption by the carriages should be realized.

In order to meet these requirements, in accordance with the invention, a carriage for container transport is characterized in that the steering element comprises a guiding-arm rotatably mounted about a vertical axis and having one or more guide rollers or guide-shoes which may be brought in contact with a rail, that the guiding arm may be detachably connected to the pole by means of coupling elements and that a second transmission extends between the front and the rear-wheel pair, in which said transmissions are dimensioned such that for the values of the turning angles $\alpha$, $\beta$ and $\gamma$ of the guiding arm, front-wheel pair, and rearwheel pair, respectively, it applies that $|-\gamma| < \beta < \alpha$.

In a practical embodiment of the carriage according to the invention, the guide rollers or guide shoes are mounted on a section being movable up and down between a lower position in which said guide rollers or shoes are in contact with a rail provided in or on the ground and an upper position wherein said coupling has been effected between the guiding arm and pole.

A transfer plant for containers, in which said carriages in accordance with the invention may be used in such a way that their guiding arm is moved automatically into the correct position, comprises at least one conveying track, said track being provided with a guide rail for guiding a train assembled of carriages in accordance with the invention and at least one conveying track without any guide rail, in which near the region of transition between one rail track and a course without rails, control means have been provided for coupling the guiding arm of the carriages to the pole, and near the transition point between a railless course and a rail-guided track, means have been provided for uncoupling said guiding arm of the carriages with respect to said pole.

The invention will now be described in more detail with reference to the accompanying Figures giving a diagrammatic representation of one embodiment of the carriage in accordance with the invention.

FIG. 1 is a side elevation and partial sectional view of the front part of a carriage, the guiding arm being in a co-operating position with a rail;

FIG. 2 is a corresponding view, in which the guiding arm is coupled to the pole;

FIG. 3 is a bottom view of parts of two carriages coupled to each other; and

FIG. 4 is a front elevation of a carriage in accordance with the invention.

The object of the construction of the carriage illustrated is that the carriage, if assembled in a train pulled by a tractor, is capable of being guided either on rail-guided conveying region or on a railless conveying region. The carriage, in accordance with the invention, will accurately follow the path covered by the tractor if guided on the railless conveying region. The carriage 1 comprises a front-wheel pair 2 and a rear-wheel pair 3 which are both rotatable about a vertical axis in the usual manner.

The front part of each carriage may be connected to a corresponding carriage or tractor by means of a pole 4. Said pole is rotatable about a vertical axis 5 lying in front of the vertical axis of rotation of the front-wheel pair 2.

The front part of the pole is provided with a coupling piece 6, said piece may rotatably co-operate with a vertical axis 7 at the back of a corresponding carriage or tractor.

A guiding arm 8 is also rotatably mounted about the vertical axis 5. Said arm has been provided with a portion 10 capable of up and down movement. A guide wheel 11 rotatable about a horizontal axis and a guide wheel 12 rotatable about a vertical axis have been disposed at the lower end of the movable portion 10.

A first transmission 13 has been provided between guiding arm 8 and front-wheel pair 2. Said transmission comprises an ear 14 constituted on the guiding arm 8, an ear 15 constituted on the wheel pair 2 and a rod 16 hinged to both ears 14 and 15.

The dimensions of the transmission parts are chosen such that an angle of rotation $\alpha$ of the guiding arm 8 results in a smaller angle of rotation $\beta$ of the frontwheel pair 2.

As is illustrated in FIG. 1, when the movable portion 10 is in a lowered position pole 4 is entirely free or decoupled from the guiding arm 8. In the position illustrated in FIG. 2 when the movable of portion 10 is in a raised position, the upper end of portion 10 projects into an opening 17 of the pole, said pole 4 thus being coupled with the guiding arm 8.

The front-wheel pair 2 is coupled with the rear-wheel pair 3 by means of a second transmission 18. The illustrated embodiment of said second transmission comprises a rod 19 rotatable about its proper central axis, said rod on both ends being in permanent communication with a rod or ear 20 (see FIG. 4). Said rods or ears 20 in turn are connected to ears 22a and 22b of the front and rear-wheel pairs 2 and 3, respectively, via link rods 21a and 21b.

The distances P1 and P2 between the connecting points of the rods 21a, 22a and 21b, 22b, respectively, and the axis of rotation of the wheel pairs 2 and 3 are chosen such that a turning angle $\beta$ of the front-wheel pair 2 corresponds with a smaller turning angle $\gamma$ of the rear-wheel pair 3. In addition, the rear-wheel pair rotates in an opposite direction to the front-wheel pair so that the relationship of the turning angles $\alpha$ and $\beta$ is represented as: $(|-\gamma| < \beta)$.

A train constituted by the carriages as described in the foregoing will be used in a transfer plant for containers. In order to accurately position a carriage-train onto the quay relative to the loading bridges it is desired that the train be guided by a rail (indicated by reference numeral 23 in FIGS. 1 and 4). In the rail-guided region, the portion 10 is actuated to a lowered position. The wheels 11 and 12 make contact with the rail 23. Since the pole 4 is not coupled with the guiding arm 8, the tractor has no direct influence on the rotation of the wheel pairs of the carriages.

For practical reasons, it is not desired to have the carriage-train be guided by a rail all through the transfer plant. When leaving the quay, portion 10 of the guiding arm 8 can, therefore, be raised (see FIG. 2).

In the raised position of portion 10, the pole 4 and the guiding arm 8 are coupled. The rotations of the wheel pairs of the carriages are thus determined by the tractor via the poles, guiding arms and transmissions. By chosing the proper transmission ratios $\alpha:\beta$ and $\beta:\gamma$, provisions are taken that the carriages may follow the bend taken by the tractor with a minimum deviation.

It is preferred that the movement of the portion 10 of the guiding arm 8 to its upper and lower positions be carried out automatically.

In FIG. 1, portion 10 at the end of the rail 23 will be forced slightly upwards by means of an ascending part 23a. The top of portion 10 will then contact a switch 25 operating the pneumatic cylinder 9 such that portion 10 reaches the position indicated in FIG. 2.

In order to move portion 10 from the position indicated in FIG. 2 into the position indicated in FIG. 1, a second switch 26 might be used, in which portion 10 on nearing the beginning of rail 23 is raised up to switch 26 by an ascending part 23b being disposed above the ground. Switch 26 controls the pneumatic cylinder 9 so that portion 10 is pushed downwards.

In that case, both ascending parts 23 and 23b constitute operating or actuating means for coupling the guiding arm of the carriage with the pole and uncoupling said guiding arm of the carriage relative to the pole.

It will be evident that the construction described in the aforegoing and illustrated in the drawings is merely one embodiment of this invention. Within the scope of the claims, however, various modifications and variations are possible. For the construction of the transmissions in particular, there are different variants (e.g. gearwheel transmissions). Instead of the pneumatic operated portion 10, the guiding arm 8 might possess a part hinged about a horizontal axis and projecting forwards at an oblique angle, said part in the elevated hinged position being retained by a locking mechanism; when approaching the rail-guided track, the locking mechanism might be unlocked automatically.

However, it is essential for this invention that the guiding arm for determining the rotation of the wheel pairs of the carriage via transmissions be detachably coupled to the pole. In addition, the transmission ratios must be chosen such that with the rotation of the guiding arm at an angle $\alpha$, the angle of rotation $\beta$ of the front-wheel pair is smaller than $\alpha$ and the angle of rotation $\gamma$ of the rear-wheel pair is smaller than and in an opposite direction to $\beta$. The desired values of the turning angle ratios $\alpha:\beta$ and $\beta:\gamma$ depend on the length of the carriage, the wheel base, the length of the pole and the minimum curve radius. With a carriage having a length of 12m, a wheel base of 8.6 m, a pole length of 2 m and a minimum curve radius of 20 m it was found that good results were achieved with a turning angle ration $\beta:\gamma$ of 0.33 and a turning angle ratio $\gamma:\beta$ of $-0.47$.

We claim:

1. A transport carriage adaptable for use with a vehicular train in a transfer conveying system having both a conveying region with carriage guide rails and a conveying region without carriage guide rails, said transport carriage comprising:
   (a) a carriage member;
   (b) a pair of front wheels rotatably mounted to said carriage member and having a turning angle $\beta$;
   (c) a pair of rear wheels rotatably mounted to said carriage member and having a turning angle $\gamma$ in opposite direction to the turning angle $\beta$; and
   (d) means for selectively steering said carriage on said carriage guide rails and without said carriage guide rails, said steering means including
      (i) a pole for connecting the carriage to another member of the vehicular train and for imparting a steering movement to the carriage when the carriage is in the conveying region without guide rails;
      (ii) at least one guide roller for imparting a steering movement to the carriage when the roller is contacting the carriage guide rails of the transfer conveying system;
      (iii) a guiding arm rotatbly mounted to said carriage member about a vertical axis with a turning angle $\alpha$, said arm operatively coupled to the guide roller and being selectively coupled to said pole for receiving steering movement when the carriage is in the conveying region without guide rails and wherein said at least one guide roller contacts the carriage guide rails when said guide arm is decoupled from said pole for alternatively imparting steering movement to said guide arm;
      (iv) a first transmission operatively connecting said guiding arm to said front-wheel pair; and
      (v) a second transmission operatively connecting said front-wheel pair and rear-wheel pair, wherein said first and second transmissions are dimensioned for forming a proportion of the turning angles $\alpha$, $\beta$ and $\gamma$ of $|-\gamma| < \beta < \alpha$.

2. The transport carriage of claim 1 wherein said guiding arm has a section on which said at least one guide roller is mounted and which is movable up and down between a lowered and raised position, wherein in the lowered position of said arm section said at least one guide roller is in contact with the carriage guide rails and said guiding arm is decoupled from said pole and in the raised position said guiding arm is coupled to said pole, and wherein the carriage further comprises means for coupling and decoupling said guiding arm to said pole.

3. The transport carriage of claim 1 further comprising means for coupling and decoupling said guiding arm to said pole actuable in response to movemnt of said carriage to and from the conveying region with carriage guide rails and conveying region without carriage guide rails.

4. A transport carriage adaptable for use with a vehicular train in a transfer conveying system having both a conveying region with carriage guide rails and a conveying region without carriage guide rails, said transport carriage comprising:
 (a) a carriage member;
 (b) a pair of front wheels rotatably mounted to said carriage member;
 a pair of rear-wheels rotatably mounted to said carriage member; and
 (d) means for selectively steering said carriage on said carriage guide rails and without said carriage guide rails, said steering means including
   (i) a pole for connecting the carriage to another member of the vehicular train and for imparting a steering movement to the carriage when the carriage is in the conveying region without guide rails;
   (ii) at least one guide roller for imparting a steering movement to the carriage when the roller is contacting the carriage guide rails of the transfer conveying system;
   (iii) a guiding arm rotatably mounted to said carriage member about a vertical axis, operatively coupled to the guide roller and selectively coupled to said pole for receiving steering movement when the carriage is in the conveying region without guide rails, and wherein said at least one guide roller contacts the carriage guide rails when said guide arm is decoupled from said pole for alternatively imparting steering movement to said guide arm;
   (iv) a first transmission operatively connecting said guiding arm to said front-wheel pair; and
   (v) a second transmission operatively connecting said front-wheel pair and rear-wheel pair.

5. A transport transfer system comprising:
 (a) transport conveying region with carriage guide rails;
 (b) transport conveying region without carriage guide rails;
 (c) vehicular transport train having at least one carriage, wherein said carriage includes:
   (i) a carriage member;
   (ii) a pair of front wheels rotatably mounted to said carriage member and having a turning angle $\beta$;
   (iii) a pair of rear-wheels rotatably mounted to said carriage member and having a turning angle $\gamma$ in opposite direction to the turning angle $\beta$; and
   (iv) means for selectively steering said carriage on said carriage guide rails and without said carriage guide rails, said steering means including
     a pole for connecting the carriage to another member of the vehicular train and for imparting a steering movement to the carriage when the carriage is in the conveying region without guide rails;
     at least one guide roller for imparting a steering movement to the carriage when the roller is contacting the carriage guide rails of the transfer conveying system;
     a guiding arm rotatably mounted to said carriage member about a vertical axis with a turning angle $\alpha$, said arm operatively coupled to the guide roller and being selectively coupled to said pole for receiving steering movement when the carriage is in the conveying region without guide rails and wherein said at least one guide roller contacts the carriage guide rails when said guide arm is decoupled from said pole for alternatively imparting steering movement to said guide arm;
     a first transmission operatively connecting said guiding arm to said front-wheel pair;
     a second transmission operatively connecting said front-wheel pair and rear-wheel pair, wherein said first and second transmissions are dimensioned for forming a proportion of the turning angles $\alpha$, $\beta$ and $\gamma$ of $|-\gamma|<\beta<\alpha$; and means for coupling and decoupling said guiding arm to said pole actuable in response to movement of said carriage to and from the conveying region with carriage guide rails and conveying region without carriage guide rails; and
 (d) control means at transition points between the conveying regions for automatically actuating said coupling means to couple said guiding arm to said pole when said carriage is moved from the guide-rail conveying region to the railless conveying region and for automatically actuating said coupling means to decouple said guiding arm from said pole when said carriage is moved from the railless conveying region to said guide-rail conveying region.

6. A transport transfer system comprising:
 (a) transport conveying region with carriage guide rails;
 (b) transport conveying region without carriage guide rails;
 (c) vehicular transport train having at least one carriage, wherein said carriage includes:
   (i) a carriage member;
   (ii) a pair of front wheels rotatably mounted to said carriage member;
   (iii) a pair of rear wheels rotatably mounted to said carriage member;
   (iv) means for selectively steering said carriage on said carriage guide rails and without said carriage guide rails, said steering means including
     a pole for connecting the carriage to another member of the vehicular train and for imparting a steering movement to the carriage when the carriage is in the conveying region without guide rails;
     at least one guide roller for imparting a steering movement to the carriage when the roller is contacting the carriage guide rails of the transfer conveying system;
     a guiding arm rotatably mounted to said carriage member about a vertical axis, operatively coupled to the guide roller and selectively coupled to said pole for receiving steering movement when the carriage is in the conveying region without guide rails and wherein said at least one guide roller contacts the carriage guide rails when said guide arm is decoupled from said pole for alternatively imparting steering movement to said guide arm;

a first transmission operatively connecting said guiding arm to said front-wheel pair;

a second transmission operatively connecting said front-wheel pair and rear-wheel pair;

means for coupling and decoupling said guiding arm to said pole actuable in response to movement of said carriage to and from the conveying region with carriage guide rails and conveying region without carriage guide rails; and (d) control means at transition points between the conveying regions for automatically actuating said coupling means to couple said guiding arm to said pole when said carriage is moved from the guiderial conveying region to the railless conveying region and for automatically actuating said coupling means to decouple said guiding arm from said pole when said carriage is moved from the railless conveying region to said guide-rail conveying region.

* * * * *